US011275784B2

(12) United States Patent
Weinberg et al.

(10) Patent No.: US 11,275,784 B2
(45) Date of Patent: Mar. 15, 2022

(54) INFORMED JOIN RECOMMENDATION

(71) Applicant: Microsoft Technology Licensing, LLC, Redmond, WA (US)

(72) Inventors: Shira Weinberg, Tel Aviv (IL); Benny Schlesinger, Ramat Hasharon (IL)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 404 days.

(21) Appl. No.: 15/637,294

(22) Filed: Jun. 29, 2017

(65) Prior Publication Data

US 2019/0005150 A1    Jan. 3, 2019

(51) Int. Cl.
*G06Q 50/00* (2012.01)
*G06F 16/9032* (2019.01)
*G06F 16/9535* (2019.01)

(52) U.S. Cl.
CPC .... *G06F 16/90328* (2019.01); *G06F 16/9535* (2019.01); *G06Q 50/01* (2013.01)

(58) Field of Classification Search
CPC ..................................................... G06Q 50/01
See application file for complete search history.

(56) References Cited

U.S. PATENT DOCUMENTS

| | | | | |
|---|---|---|---|---|
| 8,606,792 | B1* | 12/2013 | Jackson | H04L 51/32 707/748 |
| 2004/0039814 | A1* | 2/2004 | Crabtree | G06F 16/9535 709/224 |
| 2007/0083536 | A1 | 4/2007 | Darnell et al. | |
| 2011/0258200 | A1 | 10/2011 | Drummond | |
| 2013/0013720 | A1 | 1/2013 | Huang et al. | |
| 2013/0036121 | A1* | 2/2013 | Kim | G06F 16/954 707/740 |
| 2013/0318180 | A1 | 11/2013 | Amin et al. | |
| 2015/0363831 | A1* | 12/2015 | Friborg, Jr. | G06Q 30/0257 705/14.55 |
| 2015/0370798 | A1 | 12/2015 | Ju et al. | |
| 2015/0379144 | A1 | 12/2015 | Wong et al. | |
| 2016/0378756 | A1 | 12/2016 | Kemp et al. | |

(Continued)

OTHER PUBLICATIONS

Tu Ouyang and M. Rabinovich, "Weeding spammers at the root: A precise approach to spam reduction," IEEE INFOCOM Workshops 2008, 2008, pp. 1-6, doi: 10.1109/INFOCOM.2008.4544636 (Year: 2008).*

(Continued)

*Primary Examiner* — Gabrielle A McCormick
*Assistant Examiner* — Maame Ofori-Awuah
(74) *Attorney, Agent, or Firm* — Shook, Hardy and Bacon, L.L.P.

(57) ABSTRACT

Implementations described herein disclose an informed join recommendation system that allows users to make informed decision about joining various information sources such as a feed, an application, a group, a blog, a news source, etc., based on an activity grade of the information sources. The informed join recommendation system analyzes information dissemination activity of information sources over a predetermined time period to determine an activity grade of the information source, and in response to the request from a user to join the information source, provides the user the activity grade of the information source.

20 Claims, 8 Drawing Sheets

(56) References Cited

U.S. PATENT DOCUMENTS

2017/0041276 A1 2/2017 Kallayil
2018/0314761 A1* 11/2018 Lewin-Eytan .......... H04L 51/04

OTHER PUBLICATIONS

"Your guide to social networking", http://cdn.netsmartz.org/tipsheets/social_networking_tips_teens.pdf. Published on: 2010, 2 pages.
"DMPs and data-informed decision making", In White Paper of Experian, Mar. 7, 2017, pp. 1-15.
Rainie, et al., "Joining, participating in and leaving groups", In Publication of Pew Research Center, Jan. 18, 2011, 7 pages.

* cited by examiner

INFORMED JOIN RECOMMENDATION

BACKGROUND

Advances in computing and mobile technologies have resulted in people consuming large amount of information in a lot of different ways. For example, users of social media post information on their walls that other members of the social media that are connected to them may view. Similarly, when bloggers post information on the blogs and when other users respond to such blog postings, users may get an email message with an update. News sources, vendors, and other entities often send email notifications with alerts about news, special merchandise or service offers, etc.

SUMMARY

Implementations described herein disclose an informed join recommendation system that allows users to make informed decision about joining various information sources, such as a feed, an application, a group, a blog, a news source, etc., based on an activity grade of the information sources. The informed join recommendation system analyzes information dissemination activity of information sources over a predetermined time period to determine an activity grade of the information source, and in response to the request from a user to join the information source, provides the user the activity grade of the information source.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

A further understanding of the nature and advantages of the present technology may be realized by reference to the figures, which are described in the remaining portion of the specification. In the figures, like reference numerals are used throughout several figures to refer to similar components.

DETAILED DESCRIPTIONS

An informed join recommendation (IJR) system disclosed herein allows users to make informed decision about joining various information sources such as a feed, an application, a group, a blog, a news source, etc., based on an activity grade of the information sources. The informed join recommendation system analyzes information dissemination activity of information sources over a predetermined time period to determine an activity grade of the information source, and in response to the request from a user to join the information source, provides the user the activity grade of the information source. Thus, the informed join recommendation system presents to the user the anticipated effect on the user's time as a result of subscribing to an information source. Note that throughout this application, certain decisions are made based on actual activity levels and other decisions are made based on grades determined based on activity level.

Figure 1:
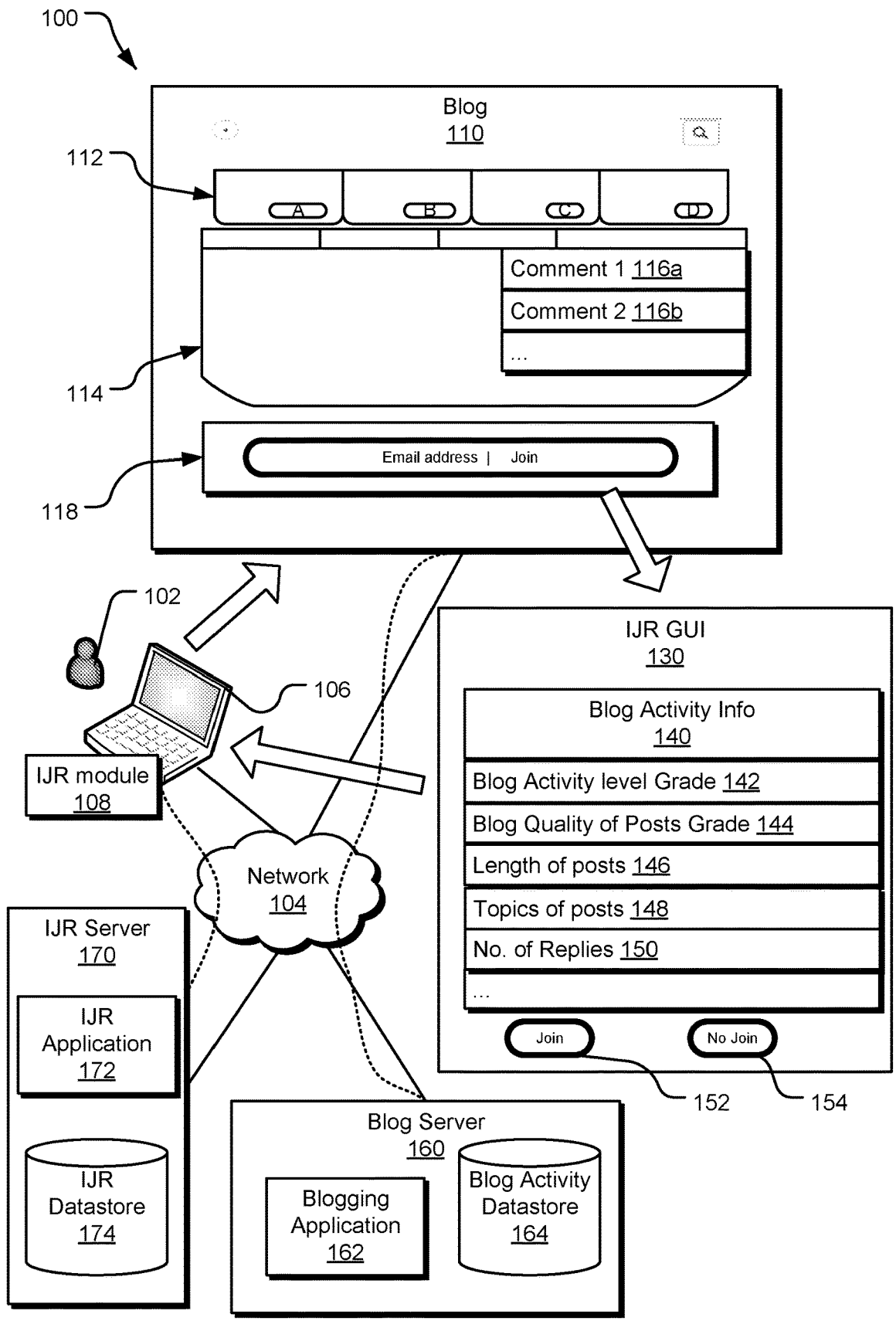
FIG. 1 illustrates an example implementation of a system for providing informed join recommendations to join an information source.

FIG. 1 illustrates an implementation of an IJR system 100 for providing join recommendations to users before they join an information source. Specifically, the IJR system 100 illustrates a user 102 accessing an information source in the form of a blog 110. The user 102 may view the content of the blog 110 using a browser on her computer, an app on her smartphone, etc. The content of the blog 110 may be managed using a blog server 160 that is connected to a network 104 such as the Internet. The user 102 may also be connected to the network 104 via a wired or wireless connection.

The blog 110 may have a number of active discussions 112 in which the user 102 may participate. For example, an active discussion thread 112 may have content 114 and a number of comments 116a, 116b. In one implementation, the user 104 may simply peruse the content of the blog 110 without being active participant in the blog 110. However, in an alternative implementation, the user 102 may desire to actively participate in the blog 110 by adding or replying to comments 116a, 116b. Yet alternatively, even if the user 102 is not interested in actively participating in the blog 110, the user 102 may still want to get updates on the activity of the blog 110. For example, such updates may include posting of new content 114, addition of new discussion thread 112, posting of new comments 116a, 116b, etc.

The blog server 160 may host a blogging application 162 that manages the information on the blog 110 including the discussions 112, the content 114, the comments 116a, 116b, etc. Furthermore, all of such information may be stored in a blog activity datastore 164 on the blog server 160. In one implementation of the blogging application 162, the blog 118 also provides a join option 118 to the user 102 to join the blog 110. Specifically, in the illustrated implementation, the join option 118 requires the user 102 to provide her email address to the join the blog 110. In an alternative implementation, the join option 118 may require alternative information from the user 102, such as the user's phone number, user's organization, the user's areas of interest, etc.

In the illustrated implementation of the IJR system 110, an IJR module 108 embedded in the browser of the user's device 106 may detect the user's selecting the join option 118 and provide various information about the blog 110 to the user 102. Specifically, the IJR module 108 may be implemented using various computer instructions that are executable on a processor of the user device 106. For example, if the user device 106 is a smartphone, the IJR module 108 may be implemented as an app on the smartphone that detects the user's selection of the join option 118 and activates an IJR graphical user interface (GUI) 130.

Specifically, the IJR GUI 130 may present various blog activity information 140 that allows the user 102 to make an informed decision. In one implementation, the IJR module 108 receives the blog activity information 140 from an IJR server 170. The IJR server 170 may include an IJR application 172 configured to monitor activities of various information sources such as the blog 110. Specifically, the IJR application 170 may collect the activity data from such information sources, save them in an IJR datastore 174, and periodically analyze the information source activity data to determine various metrics regarding the activity levels. For example, such metrics may include number of information disseminations (postings, emails, comments, alerts, etc.) per day from the information source, quality of information disseminations, length of information disseminations, user ratings of the information disseminations, topics of such information disseminations, number of replies to the information disseminations, etc.

For example, in case of the IJR GUI 130 presented in response to the user 102 selecting the join option 118 for the blog 110, the blog activity information 140 may include a blog activity level grade 142 that provides a grade based on an activity level for the blog 110. For example, such grade may be a numeric grade between 1-10, with 10 representing very high level of activity in the form of email notifications to the user 102 and 1 representing a low level of such activity. In another implementation, the blog activity level grade 142 may simply provide the activity level in the form of the number of postings per day, per hour, etc.

Similarly, the blog activity information 140 may include a blog quality of posts grade 144 that gives the quality of the posts by the blog 110 in the form of user ratings or some other qualitative criteria. The length of posts 146 may provide average length of posts by the blog 110 or average length of email notification that will received by the user 102 if the user joined the blog 110. The topics of posts 148 may provide information about the topics of the posts by the blog 110, the number of replies 150 provides average number of replies, etc.

Once the user 102 has reviewed the blog activity information 140 the user 102 may select a join button 152 to give her consent to join the blog 110 or select a no join button 154 to not join the blog 110. If the user selects the join button 152, the join module 108 passes on the email and any other information required by the blog 110 to the blog server 160. Alternatively, if the no join button 154 is selected, such information is not communicated to the blog server 160. In an alternative implementation, the IJR module 108 presents another GUI to collect the information required by the join option 118 in response to the user 102 selecting the join button 152.

The implementation of the IJR system 110 allows the user 102 to make informed decision about joining the blog 110 before she selects to do so. As a result, the user 102 does not have to deal with joining the blog 110 if she does not like the amount of email notification that she may end up receiving. For example, one of the pieces of blog activity information 140 may be the time of typical email notifications from the blog 110. If the blog 110 is pretty active in late evening hours and as a result it generates excessive notifications to its users in late evening hours, having such information as part of the blog activity information 140 allows the user 102 to determine whether she is interested in joining the blog 110.

Figure 2:
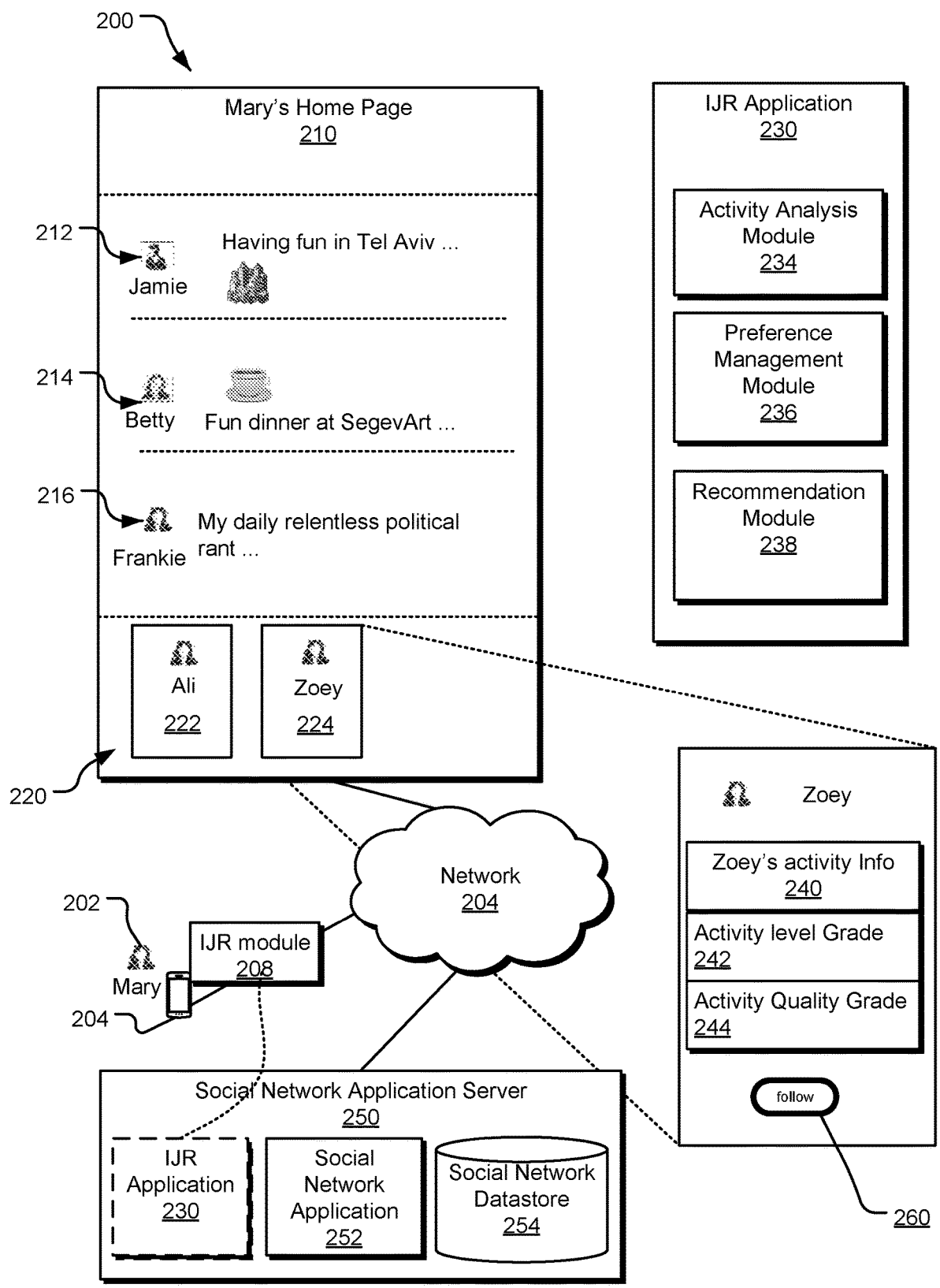
FIG. 2 illustrates an alternative example implementation of a system for providing informed join recommendations to join another information source.

FIG. 2 illustrates an alternative example implementation of an IJR system 200 for providing join recommendations to users before they join another information source. Specifically, the IJR system 200 is implemented in context of user's participation in various social networks. For example, IJR system 200 illustrates Mary's home page 210 disclosing various postings by Mary and other members that are in Mary's network. For example, Mary's network may include Jamie 212, Betty 214, and Frankie 216.

Mary 202 may access the social networking application to view her home page 210 using a smartphone 204. Mary's home page 210 may be provided by a social network application 252 working on a social network application server 250 that uses data from a social network datastore 254 to populate Mary's home page 210.

In one implementation, an IJR application 230 running on the social network application server 250 may analyze data about various members of the social network from the social network datastore 254 to determine various metrics about activity by the members of the social network. Note that while the IJR application 230 is illustrated as implemented on the social network application server 250, in alternative implementations, it may be implemented on a separate server (such as the IJR server 170 of FIG. 1). The social network application server 250, the smartphone 204, and various other devices may communicate with each other using a network 204, such as the Internet.

For example, an activity analysis module 234 may analyze postings by the members to generate data about the number of postings by the members per time period (day, month, hour, etc.), the quality of postings, average number of likes and dislikes (thumbs up/down), topics of the postings, etc.

A preference management module 236 may manage preferences of users with respect to joining various information sources. For example, the user 202 may be presented a questionnaire to get Mary's preferences as to what is the threshold level of postings per day she is willing to see from an information source. In the case of the IJR system 200 implemented for a social network, the information source may be other users of the social network such as users 212, 214, 216 that post on the social network and that are shown or Mary's home page 210.

A recommendation module 238 may take into consideration the activity levels of various members, as generated by the activity analysis module 234 and the user's preferences as determined by the preference management module 236 to generate recommendations for the user 202. For example, such recommendations 220 are posted on Mary's home page 210. Specifically, the recommendations 220 includes recommendation for Mary to follow members Ali 222 and Zoey 224. In one implementation, each of the recommendations 220 may be generated so that they are in line with the preferences for the amount and type of information dissemination (in this case, postings) generated by the members 222, 224. Alternatively, the recommendations may be generated irrespective of the information dissemination generated by the members 222, 224, however, each recommendation may include various information about the information dissemination activity of these members.

For example, Mary can select the recommendation for Zoey 224 to see further detailed information about Zoey's posting activity information 240. Zoey's activity information 240 may include activity level grade 242 that provides a letter grade to the level of posting activity by Zoey 224. For example, if Zoey 224 is very active on the social network, she may have a letter grade 242 of Z, whereas if she is posting on a more moderate level, her letter grade 242b may be B. Zoey's activity information 240 may also include an activity quality grade 244. For example, if Zoey 224 has had postings with inappropriate language, she may have a lower activity quality grade 244. After reviewing Zoey's activity information 240, Mary 202 may select a follow button 260 to follow Zoey 224. As Mary 202 has had prior knowledge of the information dissemination activity of Zoey 224, she is able to make informed decision.

In one implementation of the IJR system 200, a social networking application running on the smartphone 204 may also include an IJR module 208 that interacts with the IJR application 230 to facilitate the collection of user preferences, presentation of member activity information, etc. In one implementation, IJR module 208 may, with the user's consent, monitor activity by the user 202 on the social networking app to learn user preferences about the level of information dissemination preferred by the user. For example, the IJR module 208 may monitor which members are unfollowed by Mary 202 and based on analysis of the activity of such unfollowed accounts, determine what may be Mary's preference.

Figure 3:
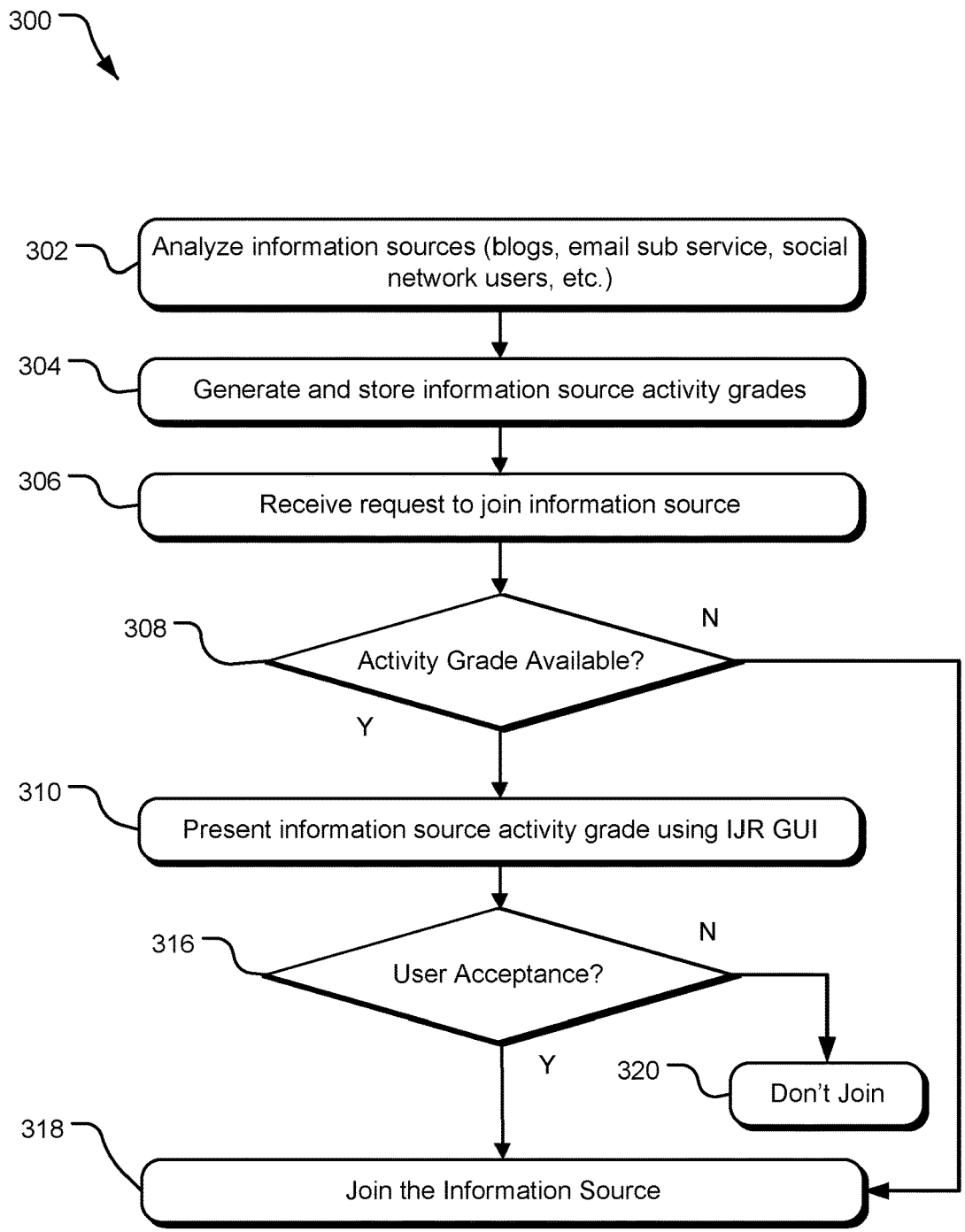
FIG. 3 illustrates example operations of an informed join recommendations system disclosed herein.

FIG. 3 illustrates example operations 300 of the informed join recommendations system disclosed herein. Specifically, an operation 302 analyzes activity from various information sources such as blogs, email subscription services, news sources, social network members, etc. An operation 304 generates and stored the activity grades for the various information sources. Such activity grades may be activity level grade, activity quality grade, activity size grade, activity content grade, etc. An operation 306 receives a request from a user to join an information source. For example, such request may be a request from a user to join a blog, a request from a user to follow a member of a social network, a request from a user to receive news alerts, a request from a user to join an email distribution list, etc.

An operation 308 determines if any activity grade is available for the information source that the user requests to join. If such activity grade is available, an operation 310 presents the information source activity grade to the user. For example, the operation 310 may present such activity grade using an IJR GUI (such as the IJR GUI 130 of FIG. 1). An operation 316 determines if the user has accepted to join the information source. If so, an operation 318 joins the user to the information source. Otherwise, an operation 320 results in the user not joining the information source.

Figure 4:
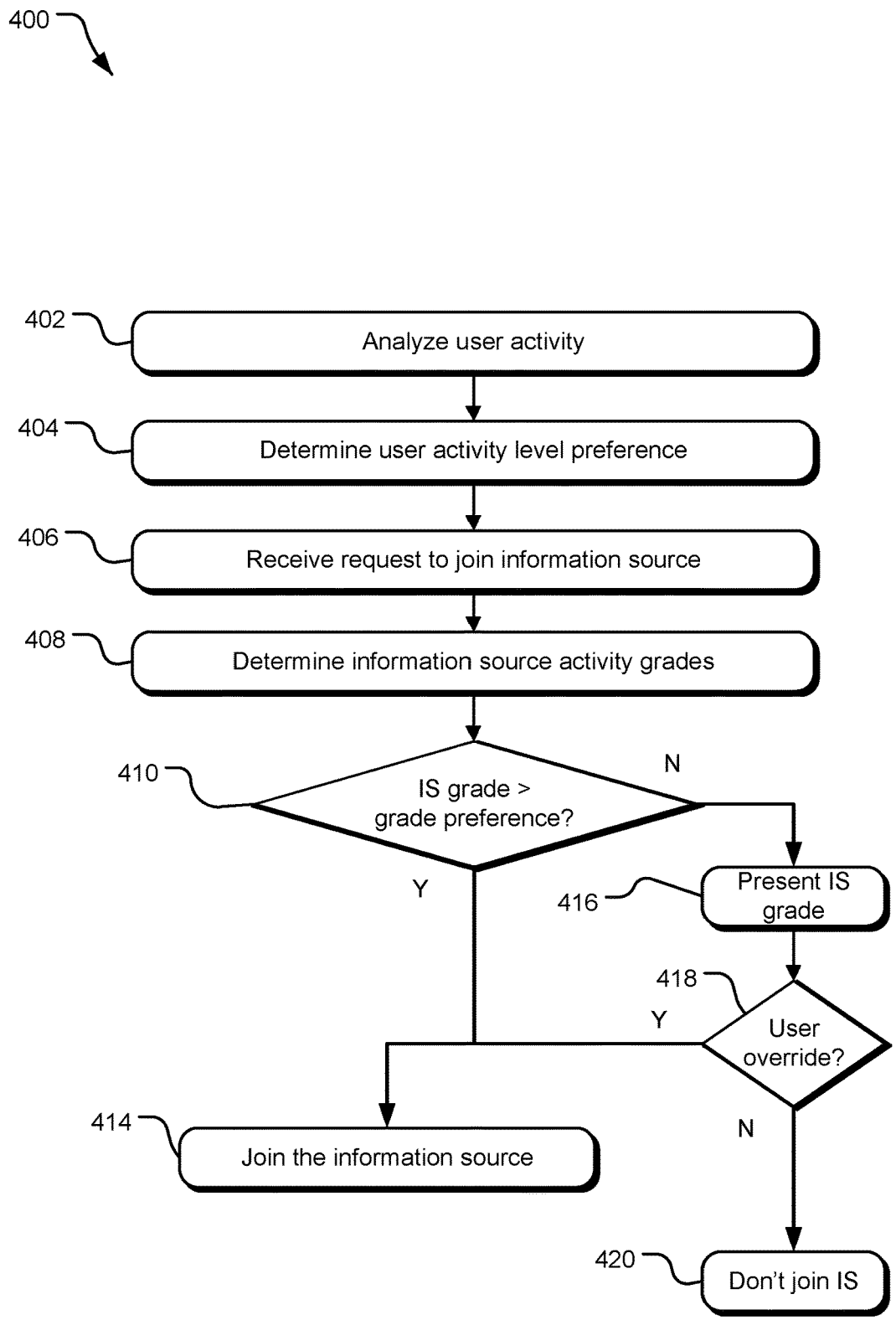
FIG. 4 illustrates alternative example operations of an informed join recommendations system disclosed herein.

FIG. 4 illustrates alternative example operations 400 of the informed join recommendations system disclosed herein. An operation 402 analyzes user activity. an operation 404 analyzes user activity with respect to the user's preferences for activity level from various information sources, such as blogs, email notifications, social network member postings, etc. An operation 406 determines receives a request from the user to join an information source. For example, such as request may be to join a blog, follow a social network member, join an email distribution list, etc.

In response to the request, an operation 408 determines various information source activity grades for the requested information source. Such activity grades may include an activity level grade, an activity quality grade, etc. An operation 410 determines if an activity grade of the information source is better than the user's preference for that grade. For example, the operation 410 compares the information source activity level grade to an activity level preference for the user and determines if the information source activity level grade meets the required threshold activity level preference by the user.

If the information source activity level grade does not meet the user's preferred activity level threshold, an operation 416 presents the actual information source grade to the user. The user may review the information source activity level grade and determine to override the recommendation to not join the information source at operation 416. In that case, an operation 414 joins the user to the information source. Otherwise, an operation 420 declines the request from the user to join the information source.

Figure 5:
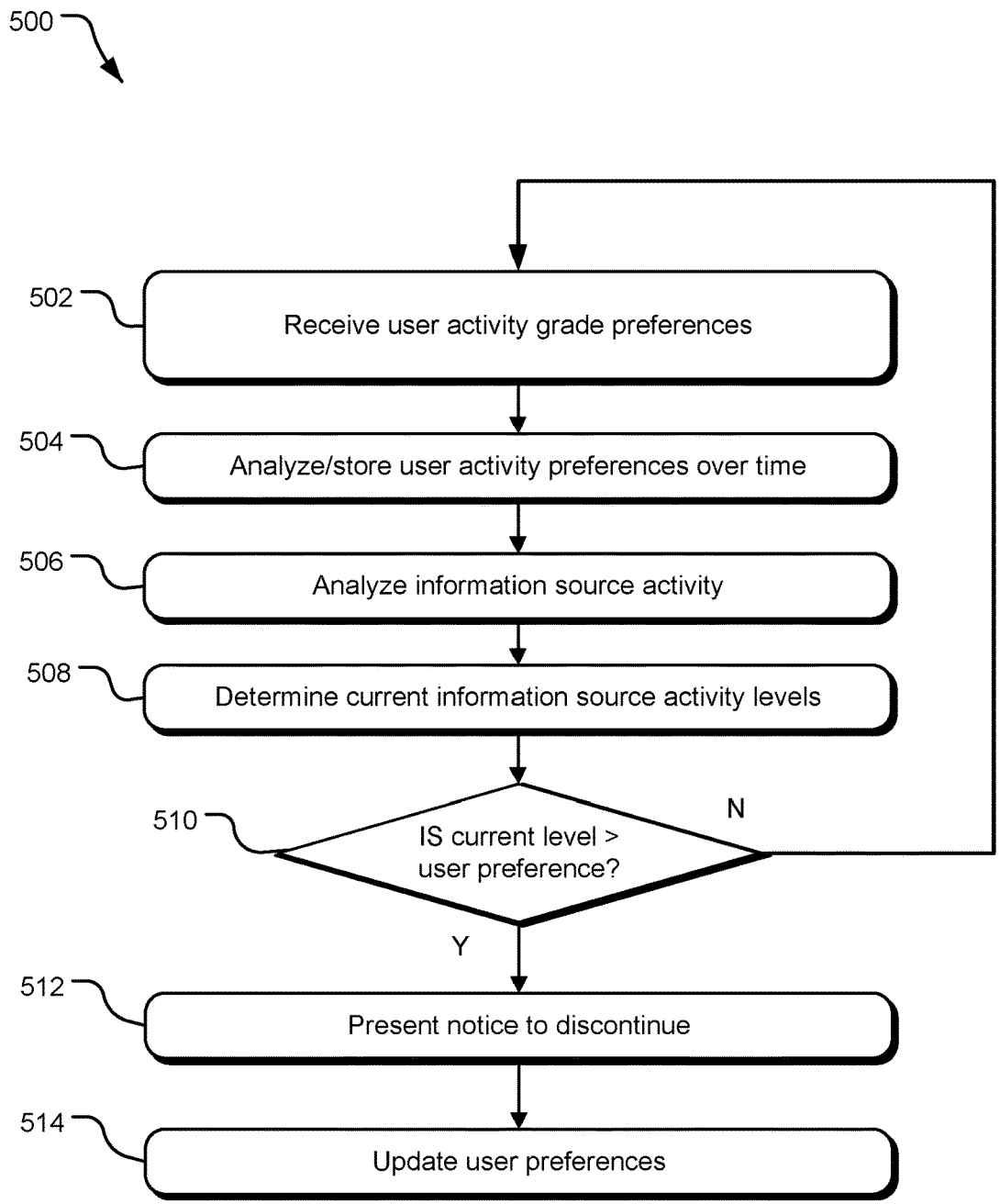
FIG. 5 illustrates alternative example operations of an informed join recommendations system disclosed herein.

FIG. 5 illustrates alternative example operations 500 of the informed join recommendations system disclosed herein. An operation 502 receives one or more user activity grade preferences. For example, a user activity grade preference may indicate that the user does not like to join an information source if the information source has an information dissemination level per day above a specified threshold. Alternatively, another activity grade preference from the user may be that the user does not like following a social network member that posts above a specified number of postings per hour.

An operation 504 analyzes such user activity grade preferences over time and stores them for future use. An operation 506 may analyze activity from an information source active for the user and an operation 508 determines the current information source activity levels. For example, if the user has joined an email notification service, an operation 508 analyzes the activity from the email notification service on a periodic basis to determine the current level of information dissemination activity per period by the email notification service. An operation 510 compares the current activity levels of the email notification service with the user preference to determine if the activity level is higher than what the user prefers. If so, an operation 512 presents a notification to the user with the current activity level of the email notification service and a recommendation to discontinue/unjoin the email notification service. Note that the user may disregard the recommendation and still continue to receive email notifications. In any case, such decision by the user is used by an operation 514 to update the user's activity level preferences.

Figure 6:
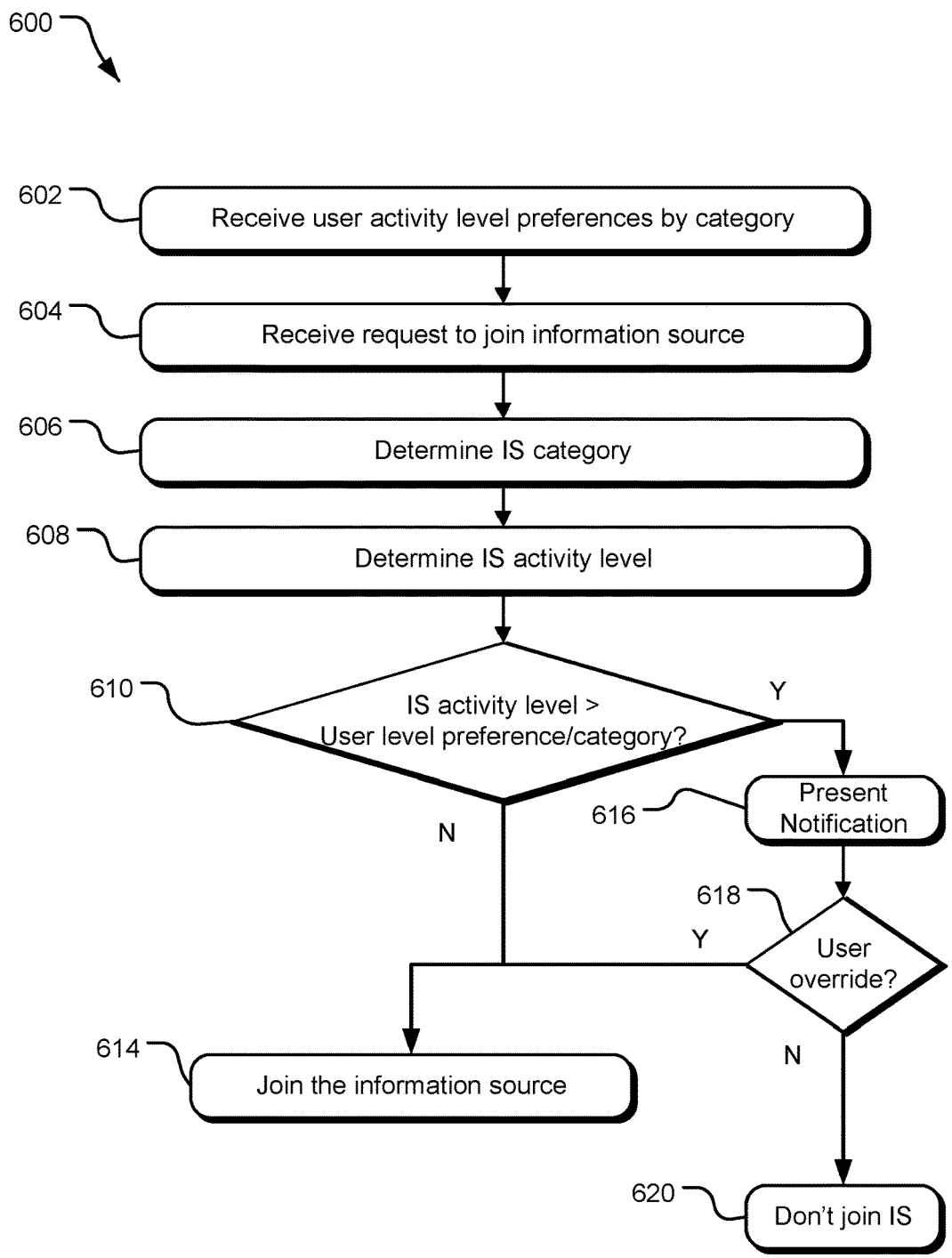
FIG. 6 illustrates alternative example operations of an informed join recommendations system disclosed herein.

FIG. 6 illustrates alternative example operations 600 of the informed join recommendations system disclosed herein. An operation 602 receives a user's activity level preferences by category. For example, the user may specify that for email notification services providing technology related notifications, the user is OK to receive up to 5 notifications per day, whereas for email notification services providing politics related notifications, the user is OK to receive up to 2 notifications per day.

An operation 604 receives a request from a user to join an information source. An operation 606 determines the category of the information source and an operation 608 determines the activity level of the information source. For example, the operation 608 may receive the activity level of the information source from an IJR server (such as the IJR server 170 of FIG. 1). An operation 610 compares the activity level of the information source with the user's preferred level of activity for the category of information source.

If the information source activity level is higher than preferred by the user for the given category, an operation 616 presents a notification to the user to notify of the higher activity level. If the user overrides the recommendation at operation 618, an operation 614 joins the user to the information source. Otherwise and operation 620 rejects the user's request to join the information source.

Figure 7:
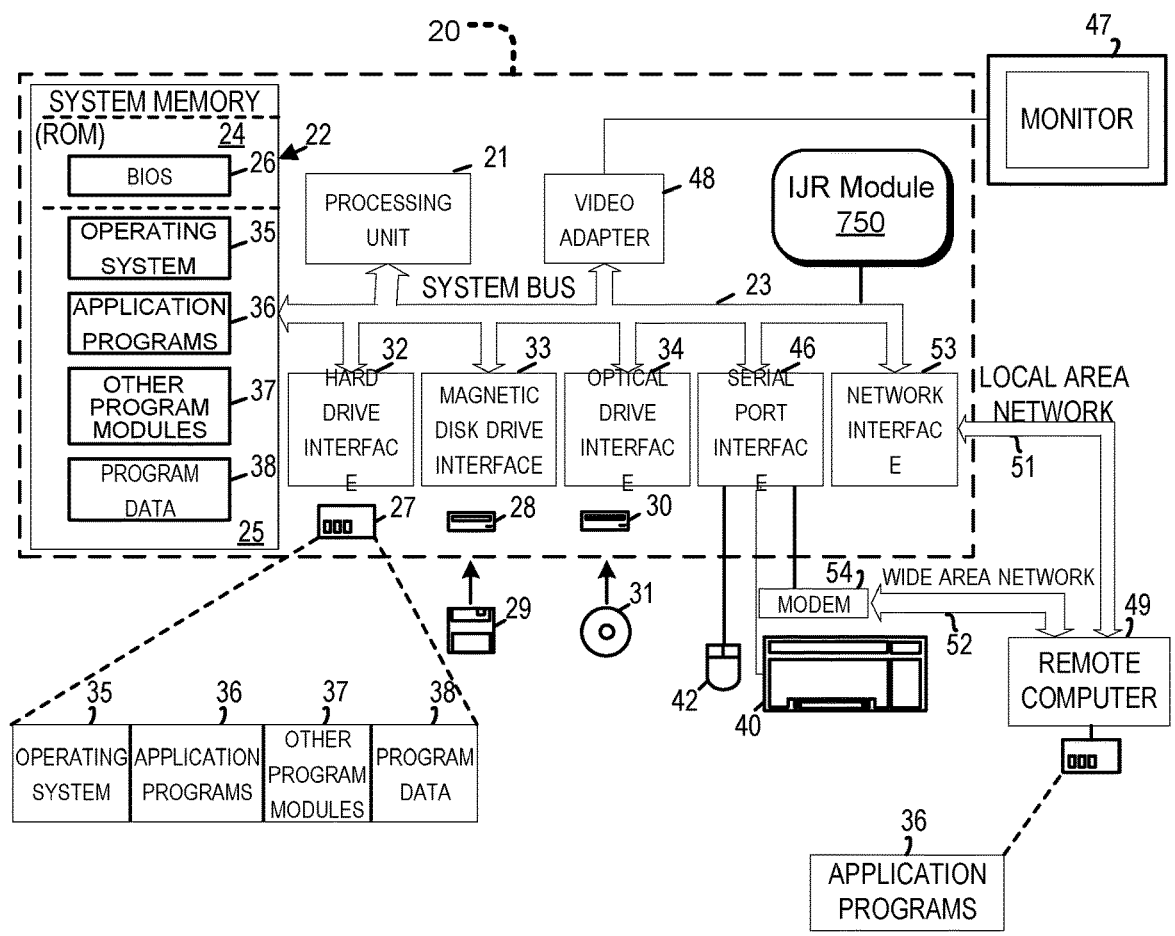
FIG. 7 illustrates an example system that may be useful in implementing the described technology for providing informed join recommendations.

FIG. 7 illustrates an example system 700 that may be useful in implementing the image rendition system disclosed herein. The example hardware and operating environment of FIG. 7 for implementing the described technology includes a computing device, such as a general-purpose computing device in the form of a computer 20, a mobile telephone, a personal data assistant (PDA), a tablet, smart watch, gaming remote, or other type of computing device. In the implementation of FIG. 7, for example, the computer 20 includes a processing unit 21, a system memory 22, and a system bus 23 that operatively couples various system components including the system memory to the processing unit 21. There may be only one or there may be more than one processing unit 21, such that the processor of a computer 20 comprises a single central-processing unit (CPU), or a plurality of processing units, commonly referred to as a parallel processing environment. The computer 20 may be a conventional computer, a distributed computer, or any other type of computer; the implementations are not so limited.

In the example implementation of the computing system 700, the computer 20 also includes a IJR module 750 providing one or more functions of the image rendition operations disclosed herein. The system bus 23 may be any of several types of bus structures including a memory bus or memory controller, a peripheral bus, a switched fabric, point-to-point connections, and a local bus using any of a variety of bus architectures. The system memory may also be referred to as simply the memory, and includes read-only memory (ROM) 24 and random access memory (RAM) 25. A basic input/output system (BIOS) 26, containing the basic routines that help to transfer information between elements within the computer 20, such as during start-up, is stored in ROM 24. The computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM, DVD, or other optical media.

The computer 20 may be used to implement an IJR system, such as the IJR system 100 as illustrated in FIG. 1. In one implementation, the blog detail, the blog activity information, and information about one or more other information sources may be stored in memory of the computer 20, such as the read-only memory (ROM) 24 and random access memory (RAM) 25, etc.

Furthermore, instructions stored on the memory of the computer 20 may be used by a system for generating informed join recommendations. Similarly, instructions stored on the memory of the computer 20 may also be used to implement one or more operations of an informed join recommendation system disclosed herein.

The hard disk drive 27, magnetic disk drive 28, and optical disk drive 30 are connected to the system bus 23 by a hard disk drive interface 32, a magnetic disk drive interface 33, and an optical disk drive interface 34, respectively. The drives and their associated tangible computer-readable media provide nonvolatile storage of computer-readable instructions, data structures, program modules and other data for the computer 20. It should be appreciated by those skilled in the art that any type of tangible computer-readable media may be used in the example operating environment.

A number of program modules may be stored on the hard disk, magnetic disk 29, optical disk 31, ROM 24, or RAM 25, including an operating system 35, one or more application programs 36, other program modules 37, and program data 38. A user may generate reminders on the personal computer 20 through input devices such as a keyboard 40 and pointing device 42. Other input devices (not shown) may include a microphone (e.g., for voice input), a camera (e.g., for a natural user interface (NUI)), a joystick, a game pad, a satellite dish, a scanner, or the like. These and other input devices are often connected to the processing unit 21 through a serial port interface 46 that is coupled to the system bus, but may be connected by other interfaces, such as a parallel port, game port, or a universal serial bus (USB).

A monitor 47 or other type of display device is also connected to the system bus 23 via an interface, such as a video adapter 48. In addition to the monitor, computers typically include other peripheral output devices (not shown), such as speakers and printers.

The computer 20 may operate in a networked environment using logical connections to one or more remote computers, such as remote computer 49. These logical connections are achieved by a communication device coupled to or a part of the computer 20; the implementations are not limited to a particular type of communications device. The remote computer 49 may be another computer, a server, a router, a network PC, a client, a peer device or other common network node, and typically includes many or all of the elements described above relative to the computer 20. The logical connections depicted in FIG. 5 include a local-area network (LAN) 51 and a wide-area network (WAN) 52. Such networking environments are commonplace in office networks, enterprise-wide computer networks, intranets and the Internet, which are all types of networks.

When used in a LAN-networking environment, the computer 20 is connected to the local area network 51 through a network interface or adapter 53, which is one type of communications device. When used in a WAN-networking environment, the computer 20 typically includes a modem 54, a network adapter, a type of communications device, or any other type of communications device for establishing communications over the wide area network 52. The modem 54, which may be internal or external, is connected to the system bus 23 via the serial port interface 46. In a networked environment, program engines depicted relative to the personal computer 20, or portions thereof, may be stored in the remote memory storage device. It is appreciated that the network connections shown are example and other means of communications devices for establishing a communications link between the computers may be used.

In an example implementation, software or firmware instructions for generating informed join recommendations may be stored in system memory 22 and/or storage devices 29 or 31 and processed by the processing unit 21. Mapping data and/or layer prioritization scheme data may be stored in system memory 22 and/or storage devices 29 or 31 as persistent data-stores. An IJR module 750 communicatively connected with the processing unit 21 and the memory 22 may enable one or more of the capabilities of the personalized user experience delivery system disclosed herein.

In contrast to tangible computer-readable storage media, intangible computer-readable communication signals may embody computer readable instructions, data structures, program modules or other data resident in a modulated data signal, such as a carrier wave or other signal transport mechanism. The term "modulated data signal" means a signal that has one or more of its characteristics set or changed in such a manner as to encode information in the signal. By way of example, and not limitation, intangible communication signals include wired media such as a wired network or direct-wired connection, and wireless media such as acoustic, RF, infrared and other wireless media.

Figure 8:
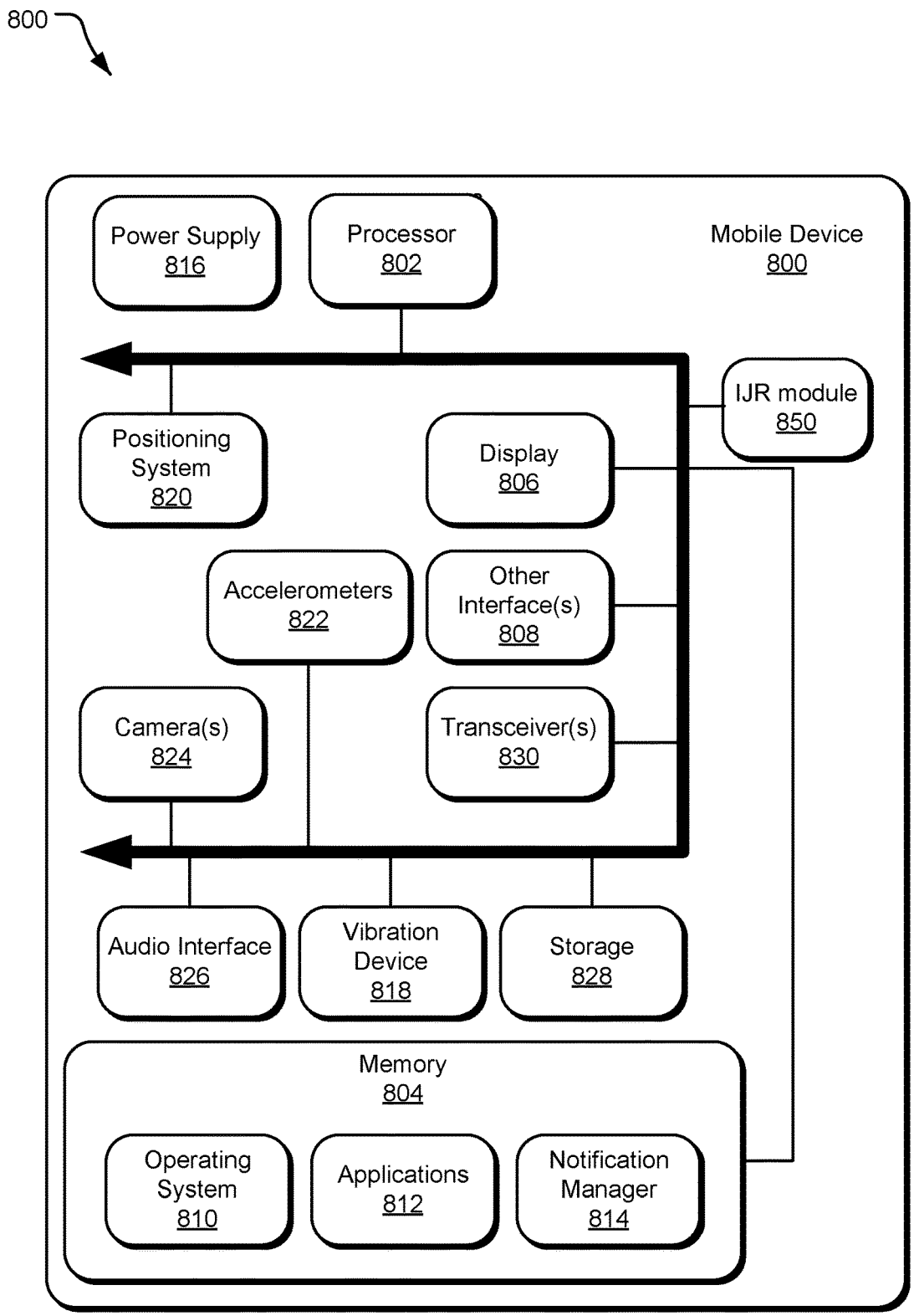
FIG. 8 illustrates an example mobile device that may be useful in implementing the described technology for providing informed join recommendations.

FIG. 8 illustrates another example system (labeled as a mobile device 800) that may be useful in implementing the described technology. The mobile device 800 includes a processor 802, a memory 804, a display 806 (e.g., a touchscreen display), and other interfaces 808 (e.g., a keyboard). The memory 804 generally includes both volatile memory (e.g., RAM) and non-volatile memory (e.g., flash memory). An operating system 810, such as the Microsoft Windows®

Phone operating system, resides in the memory 804 and is executed by the processor 802, although it should be understood that other operating systems may be employed.

One or more application programs 812 are loaded in the memory 804 and executed on the operating system 810 by the processor 802. Examples of applications 812 include without limitation email programs, scheduling programs, personal information managers, Internet browsing programs, multimedia player applications, etc. A notification manager 814 is also loaded in the memory 804 and is executed by the processor 802 to present notifications to the user. For example, when a promotion is triggered and presented to the shopper, the notification manager 814 can cause the mobile device 800 to beep or vibrate (via the vibration device 818) and display the promotion on the display 806.

The mobile device 800 includes a power supply 816, which is powered by one or more batteries or other power sources and which provides power to other components of the mobile device 800. The power supply 816 may also be connected to an external power source that overrides or recharges the built-in batteries or other power sources.

The mobile device 800 includes one or more communication transceivers 830 to provide network connectivity (e.g., mobile phone network, Wi-Fi®, BlueTooth®, etc.). The mobile device 800 also includes various other components, such as a positioning system 820 (e.g., a global positioning satellite transceiver), one or more accelerometers 822, one or more cameras 824, an audio interface 826 (e.g., a microphone, an audio amplifier and speaker and/or audio jack), and additional storage 828. Other configurations may also be employed.

In an example implementation, a mobile operating system, various applications, and other modules and services may be embodied by instructions stored in memory 804 and/or storage devices 828 and processed by the processing unit 802. User preferences, service options, and other data may be stored in memory 804 and/or storage devices 828 as persistent datastores. A IJR module 850 communicatively connected with the processor 802 and the memory 804 may enable one or more of the capabilities of the personalized user experience delivery system disclosed herein.

The informed join recommendation system disclosed herein provides solution to a technological problem necessitated by information overload and network traffic congestion resulting from excessive use of information delivered by various sources. Specifically, the informed join recommendation system disclosed herein provides an unconventional technical solution to this technological problem by analyzing the information dissemination activity of the information source over a predetermined time period to determine an activity level of the information source and providing a user the activity grade of the information source in response to a request from the user to join the information source.

A method disclosed herein includes monitoring information dissemination activity of an information source over a predetermined time period, analyzing the information dissemination activity of the information source over the predetermined time period to determine an activity level of the information source, determining an activity grade of the information source based on the activity level, receiving a request from a user to join the information source, and in response to the request from the user to join the information source, providing the user the activity grade of the information source.

In one implementation, the method includes receiving from the user a user activity grade preference and restricting the user's options to join information sources to information sources with activity grade below the user activity grade preference. Alternatively, the method also includes analyzing the user's past activity related to various information sources to determine a user activity grade preference of the user and restricting the user's options to join information sources to information sources with activity grade below the user activity grade preference. In another implementation, the method also includes receiving from the user a user activity grade preference and restricting information submissions from information sources with current activity grade above the user activity grade preference.

In one implementation, the information source is a blog and the information dissemination activity includes blog entries by various members of the blog. In another implementation, the information source is a social network member and the information dissemination activity includes social network postings by the social network member. In yet another implementation, the information source is an email subscription service and the information dissemination activity includes emails sent by the email subscription service. In another implementation, the information source is a news source and the information dissemination activity includes news alerts delivered on a mobile device.

Alternatively, determining an activity grade for the information source further comprises determining an activity grade for the information source based on average length of information postings submitted by the information source. Yet alternatively, determining an activity grade for the information source further comprises determining an activity grade for the information source based on quality of information postings submitted by the information source.

A physical article of manufacture including one or more tangible computer-readable storage media, encoding computer-executable instructions for executing on a computer system a computer process, wherein the computer process includes analyzing the information dissemination activity of an information source over a predetermined time period to determine an activity level of the information source; determining an activity grade of the information source based on the activity level; receiving a request from a user to join the information source; and in response to the request from the user to join the information source, providing the user the activity grade of the information source.

In one implementation, the computer-executable instructions further includes receiving from the user a user activity grade preference and restricting the user's options to join information sources to information sources with activity grade below the user activity grade preference. In another implementation, the computer executable instructions further includes analyzing the user's past activity related to various information sources to determine the user activity grade preference of the user. In yet another implementation, the computer executable instructions further includes determining the activity grade for the information source based on the quality of past activity by the information source. In one implementation, the information source is one of a blog, an email subscription service, a social network member, and a news source. Alternatively, the information dissemination activity is one of a blog entry, a social network posting, an email, and a news alert.

A system for providing informed join recommendations includes memory; one or more processor units; one more information sources configured to allow one or more users to register for information updates; and an informed join recommendation (IJR) module stored in the memory and executable by the one or more processor units, the IJR module configured to analyze the information dissemination activity of the information sources over a predetermined time period to determine an activity levels of the information sources, determine activity grades of the information sources based on the activity levels, receive a request from a user to join one of the information sources, and in response to the request from the user to join one of the information source, provide the user the activity grade of the one of the information sources.

In one implementation, the IJR module is further configured to receive from the user a user activity grade preference and to restrict the user's options to join information sources to information sources with activity grade below the user activity grade preference. In another implementation, the IJR module is further configured to analyze the user's past activity related to various information sources to determine the user activity grade preference of the user. Alternatively, the IJR module is further configured to determine the activity grade for the information source based on the quality of past activity by the information source.

The above specification, examples, and data provide a complete description of the structure and use of exemplary embodiments of the invention. Since many implementations of the invention can be made without departing from the spirit and scope of the invention, the invention resides in the claims hereinafter appended. Furthermore, structural features of the different embodiments may be combined in yet another implementation without departing from the recited claims.

What is claimed is:

1. A method executed via an informed join recommendation (IJR) application running on one of more processors of a user device, the method comprising:
    detecting, by the IJR application, a user selection, submitted by a user via a browsing program on the user device, of a join option provided by a new Internet information source;
    in response to detecting the user selection of the join option provided by the new Internet information source, generating a graphical user interface for receiving input to join or not join the new Internet information source; and
    determining an activity grade of the new Internet information source, the activity grade based at least in part on information dissemination activity of the new Internet information source; and
    providing an indication of the activity grade of the new Internet information source on the graphical user interface prior to receiving the input to join or not join the new Internet information source.

2. The method of claim 1, further comprising:
    receiving a user activity grade preference.

3. The method of claim 2, wherein the user activity grade preference is based on an analysis of the user's past activity related to various information sources.

4. The method of claim 1, wherein the new Internet information source is a blog and the information dissemination activity for the new Internet information source includes blog entries by various members of the blog.

5. The method of claim 1, wherein the new Internet information source is a social network member and the information dissemination activity for the new Internet information source includes social network postings by the social network member.

6. The method of claim 1, wherein the new Internet information source is an email subscription service and the information dissemination activity for the new Internet information source includes emails sent by the email subscription service.

7. The method of claim 1, wherein the new Internet information source is a news source and the information dissemination activity for the new Internet information source includes news alerts delivered on a mobile device.

8. The method of claim 1, wherein the activity grade for the new Internet information source is based on average length of information postings submitted by the new Internet information source in the information dissemination activity of the new Internet information source.

9. The method of claim 1, wherein the activity grade for the new Internet information source comprises an activity quality grade that is based on a quality of information postings submitted by the new Internet information source in the information dissemination activity of the new Internet information source.

10. The method of claim 1, wherein the activity grade for the new Internet information source comprises an activity level grade that is based on an amount of information dissemination activity generated by the new Internet information source.

11. A physical article of manufacture including one or more tangible computer-readable storage media, encoding computer-executable instructions for executing a computer process via an informed join recommendation (IJR) application running on a user device, the computer process comprising:
    detecting, by the UR application, a user selection of an option to join a new Internet information source, the option presented to a user via a user interface of a first application that displays content of the new Internet information source;
    in response to detecting the user selection of the option provided by the new Internet information source, generating a graphical user interface for receiving input to join or not join the new Internet information source;
    determining an activity grade of the new Internet information source, the activity grade based at least in part on information dissemination activity of the new Internet information source; and
    providing an indication of the activity grade of the new Internet information source on the graphical user interface prior to receiving the input to join or not join the new Internet information source.

12. The physical article of manufacture of claim 11, wherein the computer-executable instructions further comprising receiving a user activity grade preference.

13. The physical article of manufacture of claim 12, wherein the user activity grade preference is based on an analysis of the user's past activity related to various information sources.

14. The physical article of manufacture of claim 11, wherein the activity grade for the new Internet information source comprises an activity quality grade that is based on a quality of past activity by the new Internet information source in the information dissemination activity.

15. The physical article of manufacture of claim 11, wherein the new Internet information source is one of a blog, an email subscription service, a social network member, and a news source.

16. The physical article of manufacture of claim 11, wherein the information dissemination activity generated by the new Internet information source is one of a blog entry, a social network posting, an email, and a news alert.

17. A computerized system for providing informed join recommendations, the computerized system comprising:
   memory;
   one or more processor units; and
   a first application, stored in the memory and executable by the one or more processor units of a user device, that displays content of a new Internet information source;
   an informed join recommendation (IJR) application stored in the memory and executable by the one or more processor units of the user device, the IJR application configured to:
      detect a user selection, submitted by a user via a user interface of the first application on the user device, of a join option provided by the new Internet information source;
      in response to detecting the user selection of the join option provided by the new Internet information source, generating a graphical user interface for receiving input to join or not join the new Internet information source;
      access a datastore that stores activity grades for online information sources determined from monitored information dissemination activities of the online information sources over a period of time;
      determine, from the datastore, an activity grade of the new Internet information source, the activity grade based at least in part on information dissemination activity of the new Internet information source; and
      providing an indication of the activity grade of the new Internet information source on the graphical user interface prior to receiving the input to join or not join the new Internet information source.

18. The system of claim 17, wherein the UR application is further configured to receive a user activity grade preference.

19. The system of claim 18, wherein the user activity grade preference is based on an analysis of the user's past activity related to various information sources.

20. The system of claim 17, wherein the activity grade for the new Internet information source comprises an activity quality grade that is based on a quality of past activity by the new Internet information source in the information dissemination activity.

* * * * *